Dec. 8, 1959 E. L. WOLF 2,916,552

RATE SELECTOR CIRCUIT

Filed March 3, 1958 4 Sheets-Sheet 1

INVENTOR
EDWARD L. WOLF
BY George G. Seligsohn
ATTORNEY

INVENTOR
EDWARD L. WOLF
BY George J. Seligsohn
ATTORNEY

INVENTOR
EDWARD L. WOLF
BY George J. Seligsohn
ATTORNEY

INVENTOR
EDWARD L. WOLF

BY George J. Seligsohn
ATTORNEY

United States Patent Office 2,916,552
Patented Dec. 8, 1959

2,916,552

RATE SELECTOR CIRCUIT

Edward L. Wolf, Fairport, N.Y., assignor to General Dynamics Corporation, Rochester, N.Y., a corporation of Delaware Application March 3, 1958, Serial No. 718,524

7 Claims. (Cl. 179—9)

This invention relates to selecting means and particularly to means responsive to the concurrence of signals from a plurality of sources which have been previously and at odd times triggered, to produce a combinational output for entry into a use circuit such as a computer.

The object of the invention is to provide a means responsive to the registration of the last of a plurality of factors for concurrently discharging said various registrations to produce a signal charcteristic of the combination of said factors or to produce a signal in a circuit representing the combination of said factors.

One embodiment of this invention may be employed in a computer in an automatic message accounting device where charges for telephone calls are computed from the duration of a call and the structure thereof, that is, the identity of the terminating office, the area in which the terminating office is located and the identity of the originating rate point.

In the telephone system as it is being modernized every central office is designated by a code, usually two alphabetic and one numeric characters and each community is designated by a three digit area code. In accordance with what is known as the National Numbering Plan and the capabilities of the ubiquitous substation dial it is estimated that there may be as many as 540 office codes and slightly over 100 area codes (which is less than the full capabilities of the dial). Counting 15 originating rate points at a given locality where a selector in accordance with the present inveniton is to be employed, it will be seen that a fantastic number of permutations of three values may be obtained. However, it is true that the full numbers above stated will never be realized, for even in the most densely populated places, no area will contain a full complement of the possible number of offices. Therefore, while the number of permutations achieved becomes great, it is not overwhelming nor unworkable.

In accordance with the present invention a separate wire is used for each permutation, extending from a terminating office code register to an originating rate point register and passing through a terminating area code inhibiting means. Also in accordance with the rate structure represented by each such wire, they may be sorted into groups of like values and accordingly will be passed through a rate structure pick up means which will be employed to deliver a signal to the computer.

In accordance with the present invention the terminating office code register and the originating rate point register are substantially alike. Each consists of a means to trigger a bistable magnetic element to an opposite, and what may be termed an active state and each has an output which may be triggered by the return of the said bistable magnetic element to its normal state. The output of each terminating office code register is connected by a rate structure wire to the output of each originating rate point register by a plurality of rate structure wires each passing through a terminating area code blocking means. By simultaneously discharging a particular terminating office code register and an originating rate point register, a pulse can be produced to thread all of the terminating area code blocking means and by triggering all of these excepting one to produce blocking pulses, a single rate structure wire may be pulsed. Since each rate structure wire is passed through a rate pickup means a single rate circuit may thus be operated by the concurrent operation of a single terminating office code register, a single terminating area code register and a single originating rate point register.

A feature of the invention is the combination of a plurality of circuits each terminaitng at each end in a pulsing circuit whereby the concurrent operation of such a pulsing circuit at each end thereof will create a signal pulse therein. Each such circuit also threads a blocking device, which when operated concurrently with said pulsing circuit will act to block the pulse otherwise formed by said two pulsing circuits. In accordance with this feature if all the said blocking devices excepting a selected one are operated concurrently then an effective pulse may be created in some one of the circuits threading said exceptional blocking device.

A feature of the invention is a means to selectively activate the wires of an unique group extending in parallel from a selected point at one end thereof to another selected point at the other end thereof and to concurrently inhibit activity in all the said wires of said unique group with the exception of a selected one thereof whereby a signal may be produced in a selected wire of a great plurality of such wires by the concurrence of three selected signals.

The drawings consist of four sheets having seven figures, as follows.

Figures 1, 2:
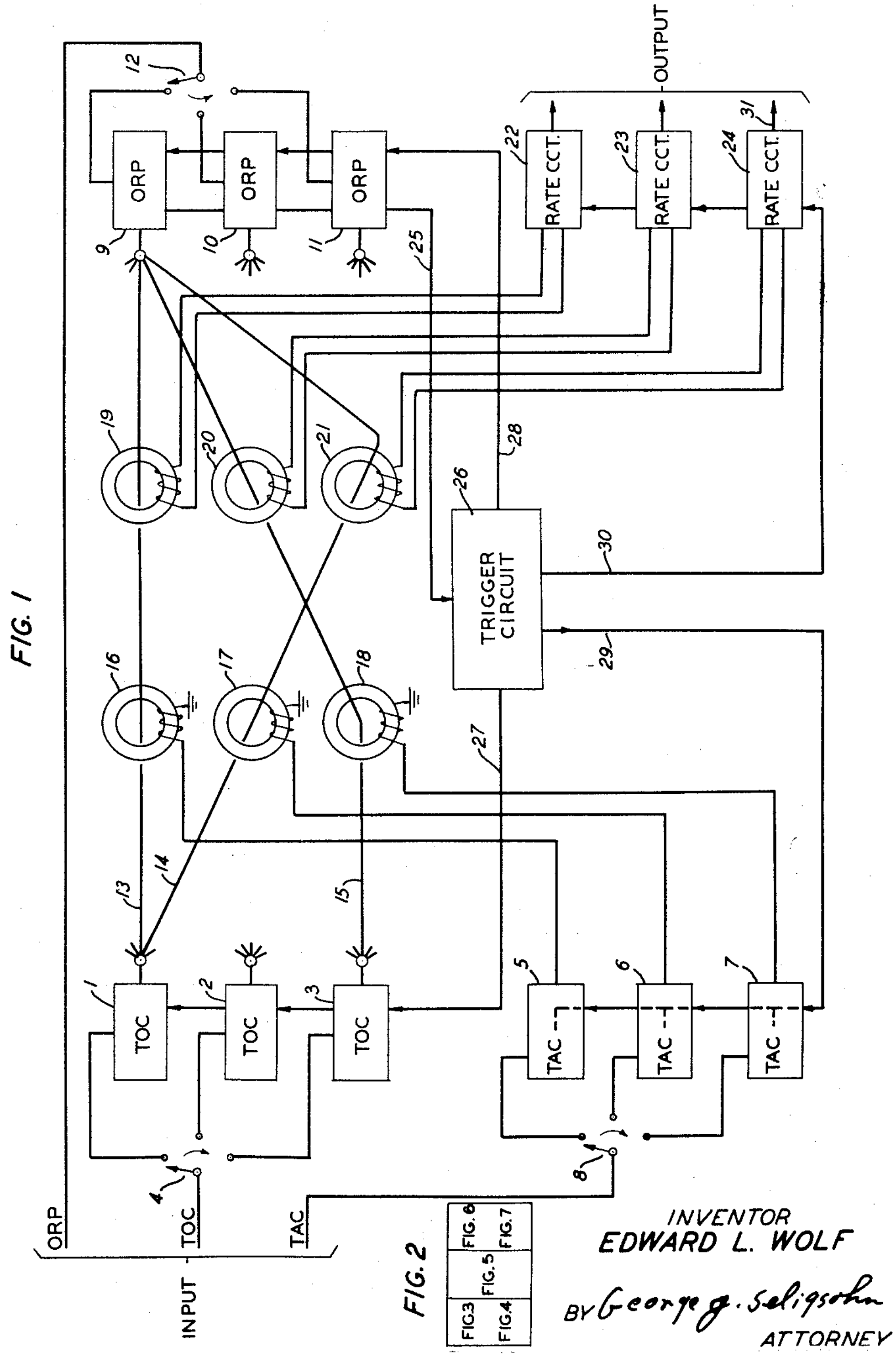
Fig. 1 is a schematic circuit and block diagram showing the fundamental arrangement of the various circuit elements used in the present invention.
Fig. 2 is a block diagram on the same sheet as Fig. 1, showing how Figs. 3 to 7 inclusive may be placed in a schematic layout to form a schematic circuit embodying the features of the present invention.

There are shown in Fig. 1, three registers 1, 2, and 3 each marked TOC for terminating office code and which may be set by some selective device such as a selecting means 4. There are also shown three registers 5, 6 and 7 each marked TAC for terminating area code and which may be set by some selective device such as a selecting means 8. And again, there are shown three registers 9, 10 and 11 each marked ORP for originating rate point and which may be set by some selecting device such as the selecting means 12.

Each TOC register has a conductor such as 13, 14 or 15 connected between its output and the output of each ORP register. Each TAC register terminates in a blocking device such as the transformer structure 16, 17 or 18, through whose core the conductors 13, 14 and 15 may be threaded. From a theoretical standpoint each connection between a particular TOC register and a particular ORP register may be multiples to provide a separate circuit to be threaded through each of the TAC blocking devices, as the multiple connections 13 and 14 both extending from the TOC register 1 to the same ORP register 9, each threads through a different TAC blocking device such as 16 and 17. However, not every area is provided with a full complement of terminating offices and hence there is not a full number of circuits such as 13 and 14 to thread the full number of blocking means 16, 17 and 18, whereby a practical device of the present nature is not impossible because of the fantastic number of permutations arising from the arithmetical considerations of the possible number of area codes and office codes.

Now each rate structure wire such as the wires 13, 14 and 15, will represent a different rate and since there are in fact only a limited number of different rates each such wire may be threaded through a different pickup means, such as the pickup coils 19, 20 or 21 each leading to an associated rate circuit such as the rate circuits 22, 23 or 24 respectively to provide through their outputs the information needed in the computer.

The different registers may be set at odd times, as the information becomes available. Thus, the TOC register 1 may first be set. At some later time the TAC register 6 may be set and finally at a still later time the ORP register 9 may be set. All the ORP registers control a circuit 25 leading to a trigger circuit 26 which thereupon concurrently sends out signals to each group of registers. The signal sent out over the circuit 27 will act to return the one bistable magnetic element among the TOC registers to normal and thus produce a stimulus in all the wires connected to the output of the TOC register 1. The signal sent out over the circuit 28 will likewise act to return the one bistable element among the ORP registers and thus produce a stimulus in all of the wires connected to the output of the ORP register 9. These stimuli being concurrent will selectively activate that unique group of wires such as 13 and 14 extending between the TOC register 1 and the ORP register 9. And again, the signal sent out over the circuit 29 will activate all of the TAC registers excepting register 6 which had been selectively set. Hence a stimulus will be set up in the blocking coils 16 and 18 whereby a pulse over the wire 13 will be inhibited and only one over the wire 14 will be allowed to pass. Since the wire 14 passes through the pickup coil 21, a pulse will be delivered to the rate circuit 24 which in combination with the concurrent signal sent out by the trigger circuit 26 over the circuit 30 will produce and transmit a rate signal over the output wire 31 for use in a computer.

Figure 3:
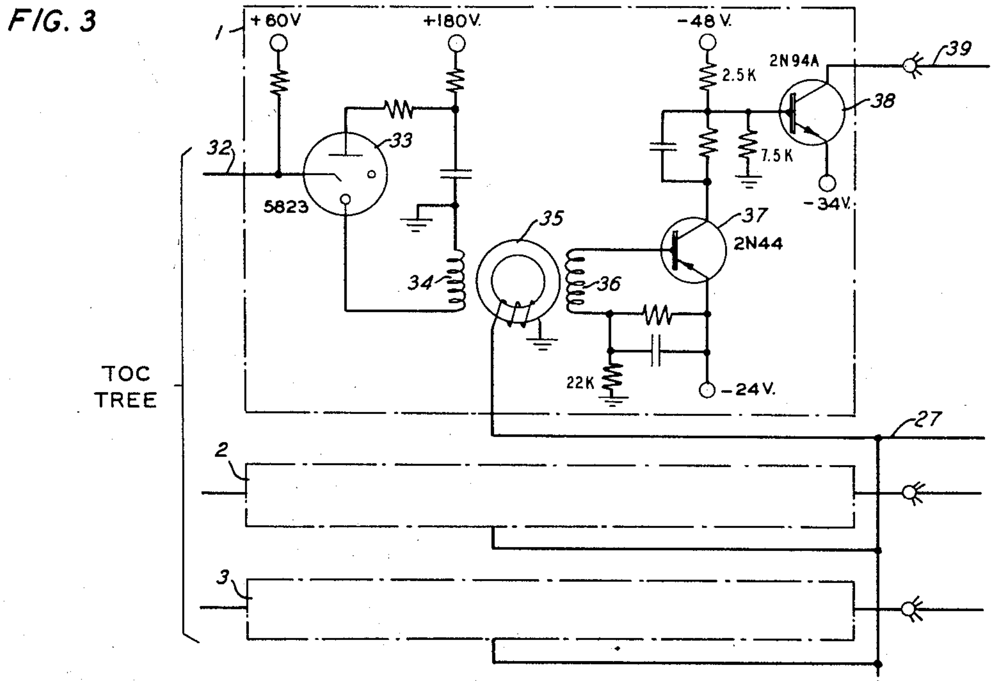
Fig. 3 shows the circuit of a TOC register.

Looking at Fig. 3 it will be seen that a TOC register such as the register 1 of Fig. 1 is shown in detail and the registers 2 and 3 are indicated. The input to this TOC register is the circuit 32 leading to the trigger of gas tube 33 so that this tube will fire and produce a temporary flow of current in its cathode coil 34, associated with the bistable magnetic element 35 thus driving this element from its normal to what may be termed its active state. This constitutes the setting of the register 1 and the register so set will remain in this condition until a pulse delivered over the circuit 27 drives the element back to its normal condition.

Figure 6:
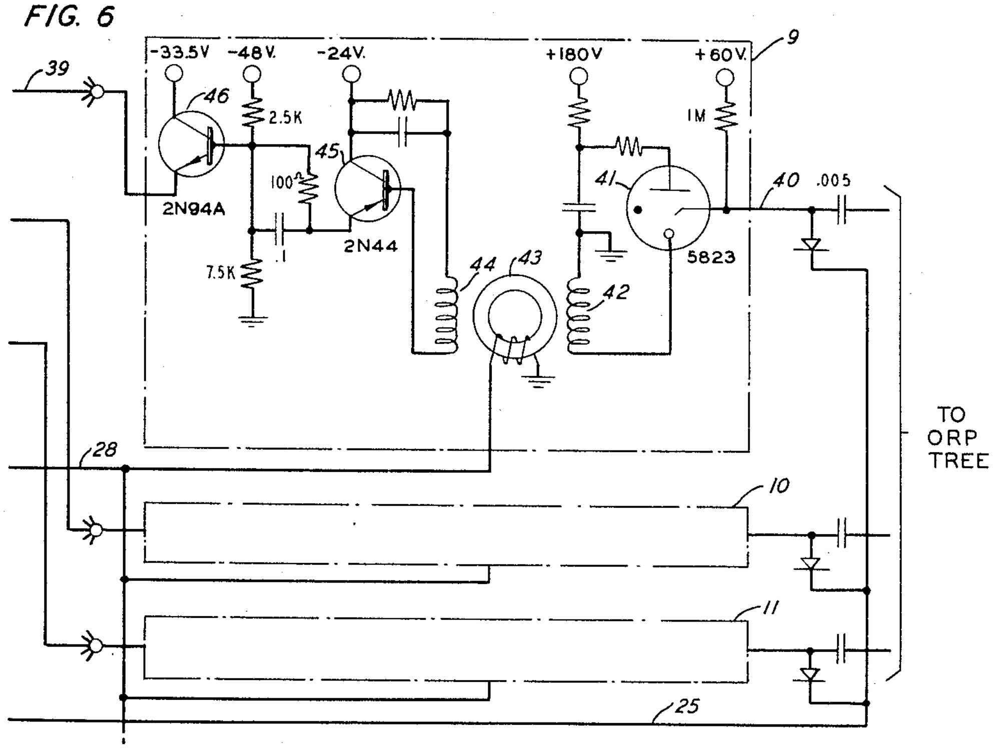
Fig. 6 shows the circuit of an ORP register.

When the signal for concurrence is transmitted over the circuit 27 as will be described hereinafter, it pulses the element 35, as well as the other similar elements in the other registers 2 and 3, but since only the element 35 is in its active state, so only the particular element 35 will go through a change of state. This will result in a properly poled pulse in the coil 36, connected effectively in the emitter base circuit of the transistor 37 and this is driven to saturation whereby the transistor 38 is activated and it, in concurrent activation of a like device in the ORP circuit 9 (Fig. 6), will produce a current pulse in the signal loop 39 (corresponding to some one of the wires 13, 14 and 15 of Fig. 1). Depending on the number of parallel wires which the wire 39 represents, an appropriate resistor (not shown) may be introduced in each such wire.

The ORP register 9 is operated in like manner to the TOC register 1. Here an incoming pulse over the input circuit 40 triggers the tube 41 and this energizes the coil 42 to drive the bistable element 43 from its normal to its active state. At some later time the concurrence signal coming in over circuit 28 drives the core 43 back to normal and the resulting pulse in the coil 44 drives the transistor 45 to saturation whereby the transistor 46 at the far end of the wire 39 cooperates with the transistor 38 to produce a pulse in this wire 39.

The only material difference in the circuits of the TOC register 1 and the ORP register 9 is in the emitter and collector connections to the transistors 38 and 46 which are arranged for cooperation one with the other to produce an effective pulse in the signal loop extending from the collector of the first to the emitter of the other.

Figure 4:
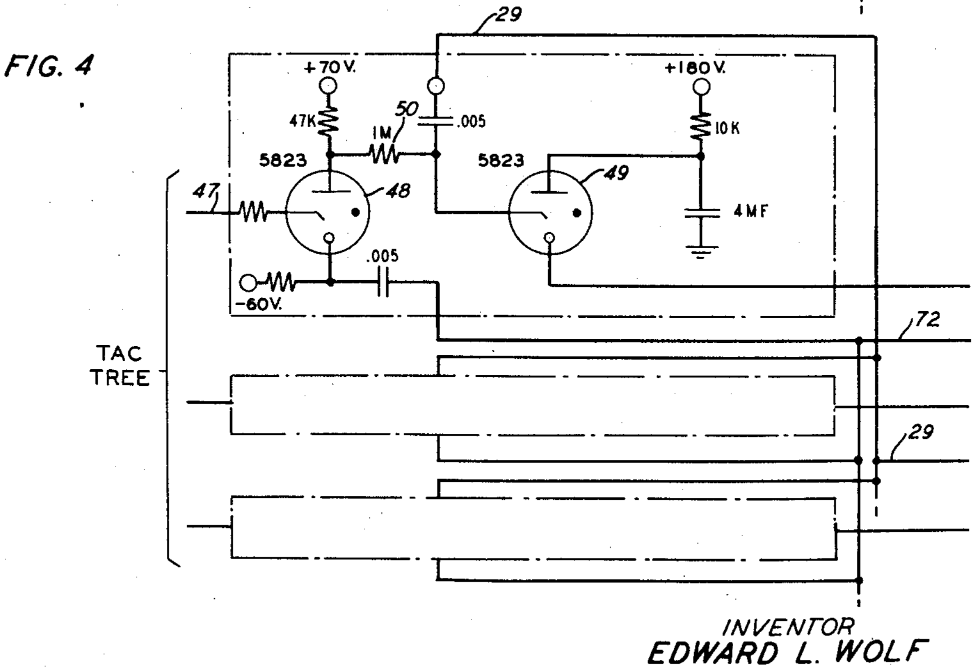
Fig. 4 shows the circuit of a TAC register.

The TAC register is shown in Fig. 4. Here an incoming pulse over the conductor 47 will trigger the tube 48 and the resulting conduction of this tube will reduce the potential on the trigger terminal of the tube 49 provided over the resistor 50. Therefore when a signal is transmitted over the conductor 29, which in all other TAC registers will be effective to trigger the tube 49, it will be ineffective in this particular register and fail to fire this specific tube 49. Therefore a pulse will be delivered to each of the blocking coils 51 and 52 but no such pulse will be delivered to coil 53. Therefore only the circuit 39 will be effective, the pulses in other wires threading the remainder of the TAC blocking coils being inhibited.

Figure 5:
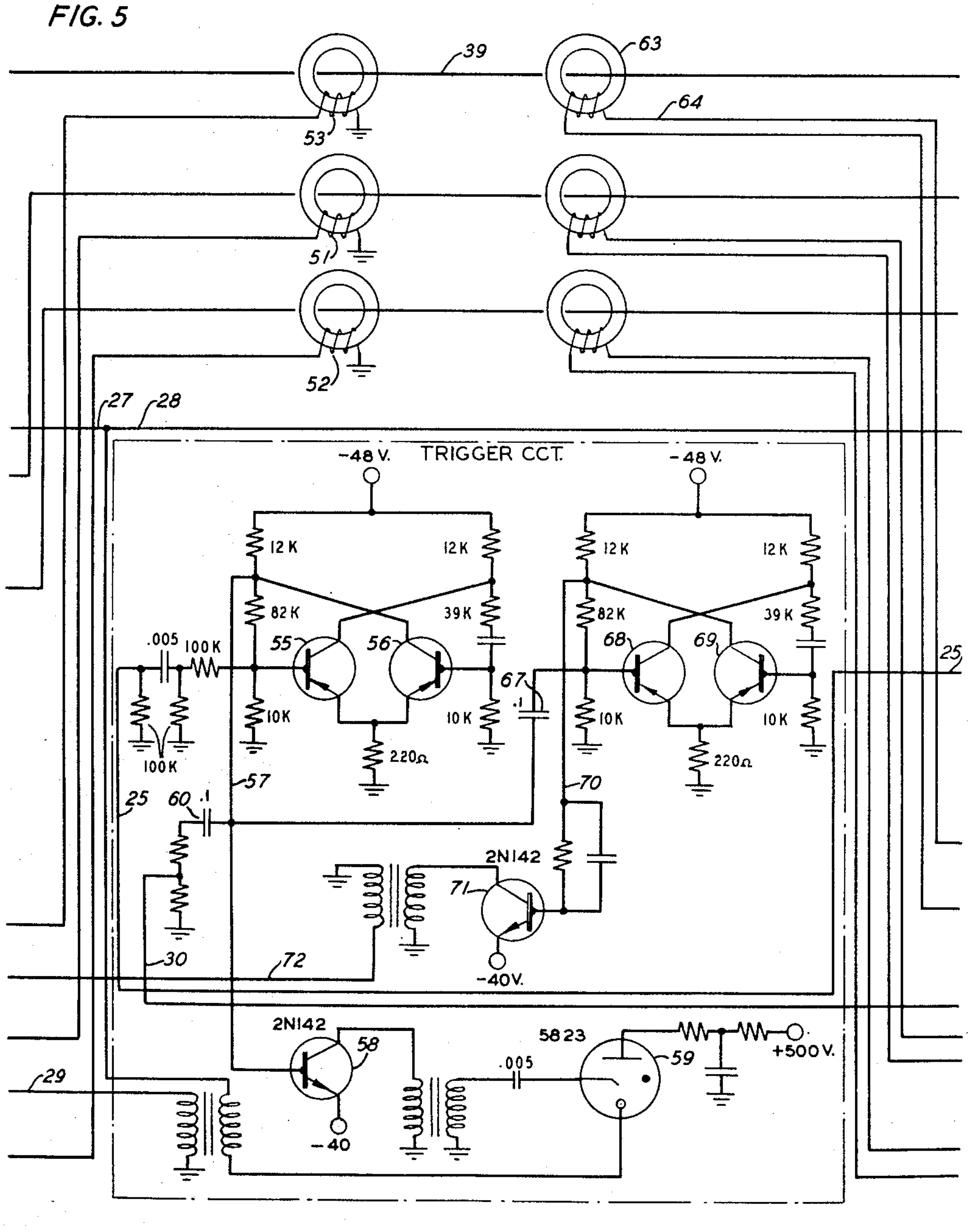
Fig. 5 shows the circuits of the TAC blocking coils, the rate circuit pickup coils and the trigger circuit for concurrently pulsing the various registers.

The concurrent signals on the wires 27, 28 and 29 and a signal on the wire 54 to quench the tube 48, are produced and transmitted by the trigger circuit shown in Fig. 5, represented in Fig. 1 by the trigger circuit 26.

Assuming that the TOC, TAC and ORP registrations made at odd times are made in that order and that therefore the ORP registration is the last to be made, a pulse will be transmitted on the setting of the ORP register over the circuit 25 to operate the cascade of two single shot multivibrators.

The pulse on wire 25 will first operate the multivibrator consisting of the transistors 55 and 56 and will produce a pulse on the wire 57 which will trigger the circuit of the power transistor 58 and will fire the tube 59 to concurrently pulse the circuits 27, 28 and 29 to discharge the three registers as described.

Figure 7:
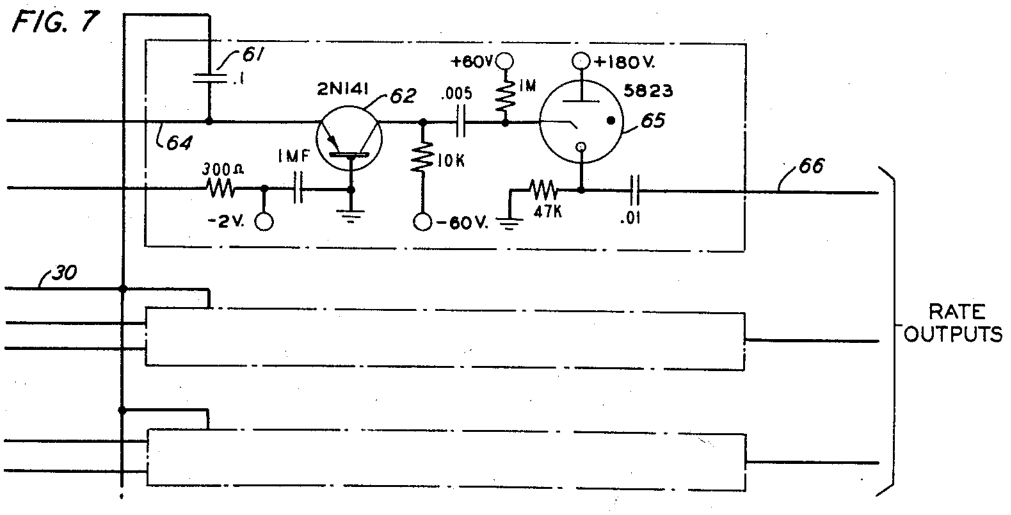
Fig. 7 shows the circuit of a rate circuit.

This pulse, the single shot from the multivibrator above described, also passes the capacitor 60 and delivers a pulse over the circuit 30 leading to the rate circuits such as 22, 23 and 24 as shown in Fig. 1. In Fig. 7 the pulse on circuit 30 passes the capacitor 61 to the emitter of the power transistor 62. If at this same instant the pulse passes over conductor 39, a pulse will be picked up by the transformer core 63 and the concurrence of pulses over the capacitor 61 and the conductor 64 will trigger this power transistor 62 so that the tube 65 will respond and produce an output pulse on the output wire 66.

Again the single shot pulse on the conductor 57 will also pass the capacitor 67 to operate the second single shot multivibrator consisting of the transistors 68 and 69 and will deliver a pulse over the wire 70 to the base of the power transistor 71 whereby a pulse will be delivered over the wire 72 to quench the tube 48.

Thus it will be seen that by the concurrence of signals produced by three separate registers all previously set, a rate circuit pickup may be pulsed and an output signal passed from a corresponding rate circuit to a use circuit such as a computer.

What is claimed is:

1. A first plurality of registers each having an output terminal, a second plurality of registers each having an output terminal, each register of said first plurality and of said second plurality having a bistable magnetic element and means controlled thereby responsive to a change in state from an active to a normal state thereof to create an output pulse in the respective output terminal of that register of said first plurality and said second plurality, means for selectively setting said registers of said first plurality and said second plurality consisting of means to drive said bistable magnetic elements from a normal to an active state thereof, a third plurality of registers each having an output element in the form of a transformer core through which conductors may be threaded and each having a tube normally conditioned to fire and transmit a pulse to activate said output transformer core, means for selectively setting said registers of said third plurality consisting of means for disabling said tubes to prevent the firing thereof, a concurrence circuit for each permutation of one register of each said plurality, each said circuit extending from an output terminal of a register of said first plurality, through a core of a register of said third plurality to an output terminal of a register of said second plurality, and means for concurrently triggering all of said registers to cause a change of state of the said bistable magnetic elements in said selectively set registers of said first and said second pluralities to produce a pulse in all of said circuits permutated between said set registers and to fire said tubes in all said registers of said third plurality excepting in said selectively set register to produce an inhibiting pulse in all said output cores excepting that core associated with said selectively set registers whereby said pulses in all said set of circuits permutated between said selectively set registers of said first and said second pluralities will be inhibited excepting only that circuit threaded through the said core of said selectively set register of said third plurality.

2. A combination as claimed in claim 1, in which means is provided to set one register of each said plurality in sequence and in which said triggering means is responsive to the setting of the third in sequence of said registers to be set.

3. A combination as claimed in claim 2, in which said triggering means includes a single shot multivibrator responsive to the setting of said third register and having an output leading to all of said registers for concurrently triggering a concurrence circuit determined by said three set registers.

4. A combination as claimed in claim 3, in which a second single shot multivibrator is provided in cascade with said first single shot multivibrator, said second single shot multivibrator having an output wired to said registers of said third plurality for restoring a set one of said registers to normal.

5. A combination as claimed in claim 1, in which a plurality of rate circuits are provided each having a pickup coil wound about a transformer core and in which said concurrence circuits are divided into equal value rate groups and in which the circuits of each said group are threaded through one of said cores.

6. A first plurality of registers each having an output terminal, a second plurality of registers each having an output terminal, a third plurality of registers each having a blocking terminal in the form of a transformer core, a fourth plurality of registers each having a pickup means in the form of a transformer core, a concurrence circuit for each permutation of one register of each of said first three pluralities of registers, each said circuit extending from an output terminal of a register of said first plurality, through a core of a register of said third plurality, through a core of a register of said fourth plurality to an output terminal of a register of said second plurality, means for selectively setting one register of each of said first three pluralities, and means for concurrently causing said set registers to activate said concurrence circuit determined by said three registers to set said register of said fourth plurality.

7. A first plurality of registers each having an output terminal, a second plurality of registers each having an output terminal, a third plurality of registers each having a blocking terminal in the form of a transformer core, a concurrence circuit for each permutation of one register of each of said pluralities, each said circuit extending from an output terminal of a register of said first plurality, through a core of a register of said third plurality to an output terminal of a register of said second plurality, means for selectively setting one register of each of said pluralities, and means for concurrently causing said set registers of said first and said third pluralities and all of the registers of said second plurality with the exception of said set register to combine their outputs to activate said concurrence circuit determined by said three selectively set registers.

References Cited in the file of this patent

UNITED STATES PATENTS

| | | |
|---|---|---|
| 2,305,779 | Hebel | Dec. 22, 1942 |
| 2,404,654 | Potts | July 23, 1946 |